United States Patent
Petranovich

(10) Patent No.: US 7,061,976 B1
(45) Date of Patent: Jun. 13, 2006

(54) MULTIPLE SYMBOL RATE BURST EQUALIZER TRAINING

(75) Inventor: Jim E. Petranovich, Encinitas, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 922 days.

(21) Appl. No.: 09/910,289

(22) Filed: Jul. 19, 2001

(51) Int. Cl.
*H03H 7/30* (2006.01)

(52) U.S. Cl. ........................ 375/233; 375/225
(58) Field of Classification Search ........ 375/230–233, 375/350, 225; 370/468, 497; 708/322–323; 714/779
See application file for complete search history.

(56) References Cited

U.S. PATENT DOCUMENTS 3,978,407 A * 8/1976 Forney et al. ............... 375/231
6,760,371 B1 * 7/2004 Bach ........................... 375/232
2003/0048839 A1 * 3/2003 Beale et al. .................. 375/229

* cited by examiner

*Primary Examiner*—Khanh Tran
(74) *Attorney, Agent, or Firm*—Farjami & Farjami LLP

(57) ABSTRACT

An equalizer is trained based on a packet, which includes a preamble segment, a header segment and a payload segment, wherein each of the segments has a symbol rate. Further, the equalizer has a number of filter taps. A training method of the equalizer includes adapting the filter taps according to the preamble segment and extracting from the header segment a symbol rate value of the payload segment. If the symbol rate value of the payload segment, which is extracted from the header segment, indicates that such symbol rate is higher than the symbol rates of the preamble and header segments, the filter taps are re-adapted according to the preamble segment, and a number of zeros are inserted into the preamble and header segments to account for the difference between the symbol rate of the payload segment and the symbol rates of the preamble and header segments.

20 Claims, 6 Drawing Sheets

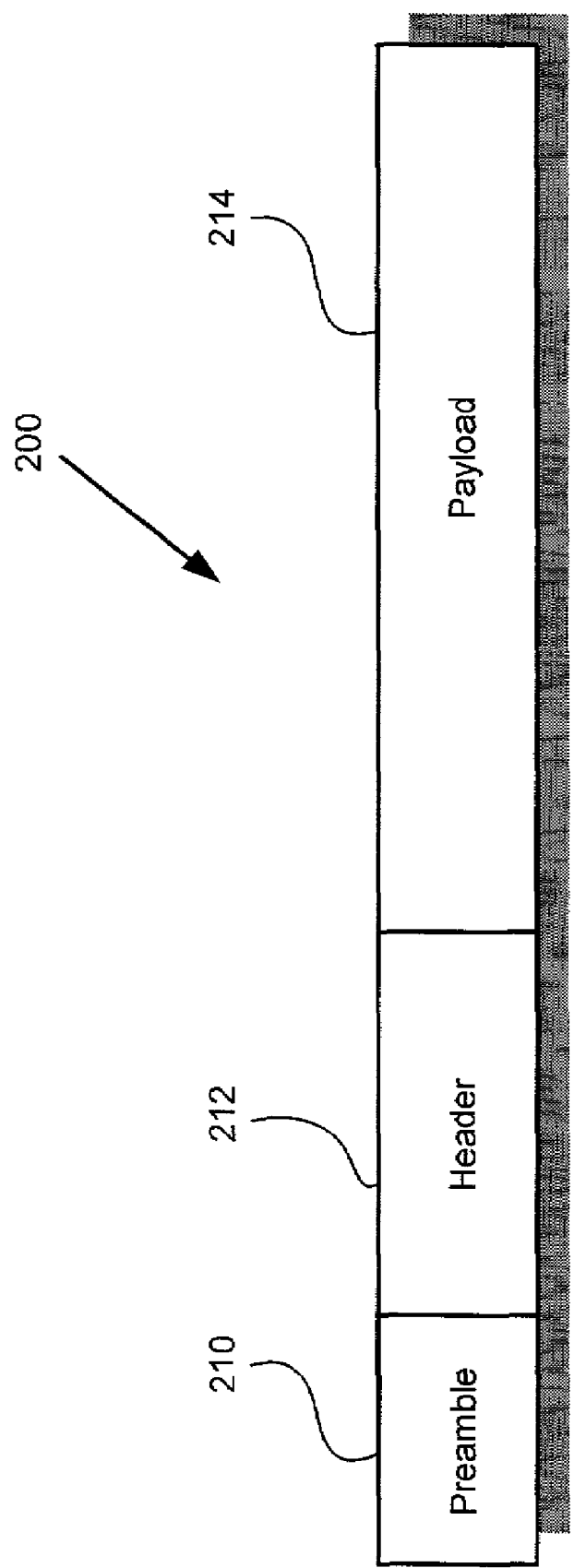

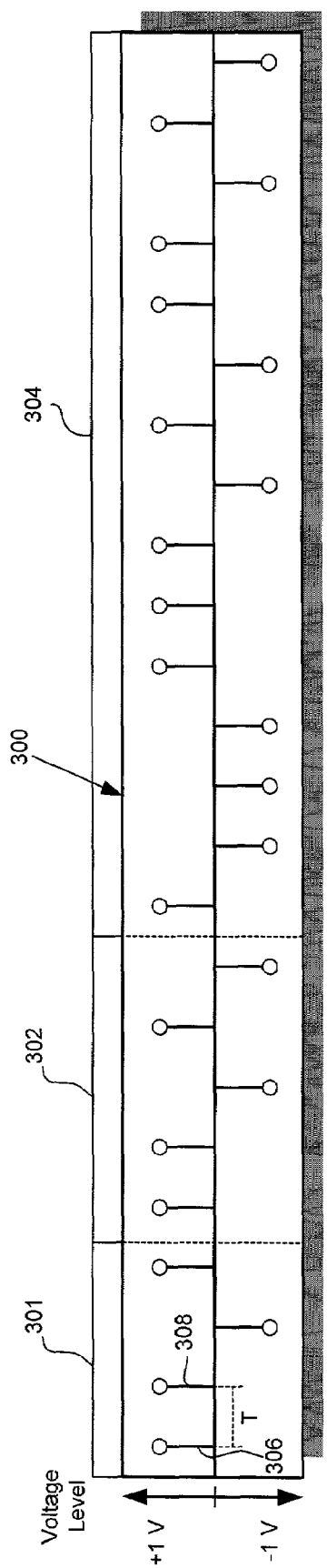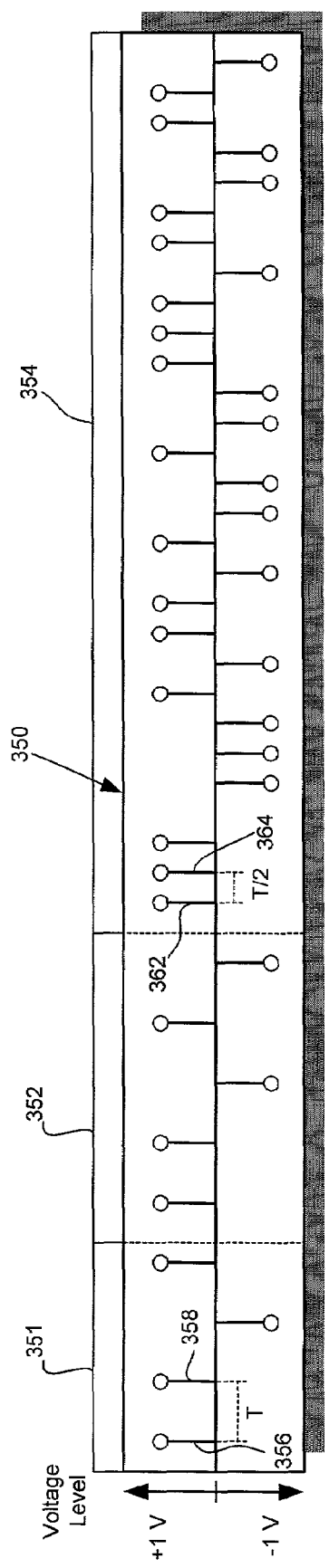

MULTIPLE SYMBOL RATE BURST EQUALIZER TRAINING

BACKGROUND OF THE INVENTION

1. Field of the Invention

The present invention generally relates to communication networks and more particularly to equalizer training.

2. Related Art

Communications networks have become quite common place in office environment and are slowly finding more and more applications at homes. Conventionally, communications networks communicate through communications links, such as T1 lines, cable lines, telephone lines and the like. For example, home networking may be accomplished via standard phone lines as transmission media. Typically, a communications network has several devices connected to it. For instance, a local area network ("LAN") 101 shown in FIG. 1 can have numerous devices attached to it, such as personal computer 102, printer 106, personal digital assistant ("PDA") 104, and laptop 108.

When a communications network, such as LAN 101 has many devices connected, the devices may interfere with receive signals intended for another device and, for example, may echo in such receive signals. For instance, when personal computer 102 sends signal 110 to an intended receiver, for example, laptop 108. Signal 110 is sent over the transmission medium, for example, home telephone line. The transmission medium for LAN 101 is a broadcast channel, in which other connected devices, such as PDA 104 may receive the signal, as shown by signal 112. As with any electrical transmissions circuit, if an impedance mismatch exists between the transmission medium and PDA 104, then signal 112 may be reflected, as shown by signal 114. Accordingly, received signal 116 would contain reflections when it reaches laptop 108, and such reflections or echoes may cause errors in the receive signal, which would increase the number of transmission errors.

Another common source of signal distortion is intersymbol interference ("ISI"), which is typically caused by the transmission medium of LAN 101. Typical wired transmission media, such as the twisted pair phone wiring used in LAN 101, have frequency dependent dispersion, and thus are typically band-limited. According to known digital communications theories, a band-limited transmission medium effectively disperses transmitted symbols in time. In other words, if an impulse signal is sent through a band-limited transmission medium it will be dispersed in time when it is received. ISI occurs when the pulse response of a band-limited transmission medium is longer in duration than the duration between transmitted symbols.

Dispersion from a band-limited medium causes a symbol to overlap with neighboring symbols. For example, when a transmitted symbol is a pulse, such pulse is dispersed in time and a transient portion of the signal exists before and after the transmitted pulse. The transient portions interfere with adjacent symbols, thus distorting adjacent symbols. The transient portion before the transmitted symbol is known as pre-cursor ISI and the transient portion after the pulse is transmitted is known as post-cursor ISI. In general, ISI becomes more problematic in high data rate systems because the duration between successive symbols is shorter.

Furthermore, symbols are typically distinguished from one another by symbol's respective voltage level. For example, a first symbol can be distinguished by a "+1" voltage level, while a second symbol can be distinguished by a "−1" voltage level. The effects of ISI may be observed when viewing an eye-pattern diagram of a transmitted signal on an oscilloscope. Normally, an eye-pattern diagram is substantially open when ISI is not present. In that case, a symbol is less susceptible to being misinterpreted for another symbol because of random noise. When the voltage levels of transmitted symbols are far apart from each other, each symbol is easily distinguished and, as a result, symbols are less susceptible to random noise, which may be caused by any number of noise sources, such as motorized appliances, i.e. vacuum cleaners, spark plug ignitions and the like.

On the other hand, when ISI is present, the eye-pattern diagram is closed. As such, the transmitted symbols are closer together in magnitude. As a result, symbols are less tolerant to random noise, because any interference reduces the minimum voltage level distance from an another symbol. For example, when ISI is not present, a first symbol is received with a voltage level of +1 Volts and a second symbol is received with a voltage level of −1 Volts. When ISI is present, the first symbol may be received with +0.3 Volts and the second symbol may be received with a voltage level of −0.3 Volts. If at one instance, the additive random noise contributes a +0.4 Volts to the second symbol, the resultant symbol will be 0.1 Volts. In such exemplary binary system, positive voltage levels are interpreted as the first symbol and negative voltage levels are interpreted as the second symbol and, thus, the random noise in conjunction with ISI create a symbol error. Had ISI not been present, the random noise alone would not create a symbol error.

To mitigate the distortive effects of ISI and echoes, an adaptive equalizer may be used. Adaptive equalizers can accommodate time-varying conditions of transmission medium. Also, an adaptive equalizer can estimate a model of the distortive effects of ISI and echoes in the transmission medium. Once an accurate model of the interference is ascertained, the adaptive equalizer may undo the distortive effects of the transmission medium. In order to assist the adaptive equalizer to estimate a model of the interference, a transmitter and receiver may share a common known sequence between each other. In such a scheme, the transmitter transmits the common sequence to the receiver. Since the receiver knows exactly how the unperturbed sequence should appear before being disturbed by the communications link, the adaptive equalizer is able to use the known sequence as a reference to estimate the distortion. Using a known sequence to undo the distortive effects of transmission medium of LAN 101 is a common bootstrapping method used in digital communications. Such known sequence, when transmitted at the start of a packet, is commonly referred to as a preamble.

The preamble is conventionally contained at the beginning of each transmitted packet and is used by the adaptive equalizer to train to a known sequence before processing the transmitted data contained in the transmitted packet. In any given communication protocol, all packet transmissions follow a known packet structure. FIG. 2 illustrates an exemplary packet structure. As shown, packet 200 contains preamble 210, header 212 and payload 214. Preamble 210 contains a known sequence, which is used to train an adaptive equalizer. For example, preamble 210 may be transmitted at two (2) mega-samples per second ("MSPS").

As further shown, packet 200 also comprises header 212, which may include information such as the modulation type and symbol rate for the payload 214. Modulation type may indicate various modulation techniques, such as QAM (Quadrature Amplitude Modulation), PSK (Phase Shift Keying) and the like, which may used for modulating payload 214 data. The Header 212 is commonly transmitted with a predetermined modulation type and symbol rate referred to as the "base symbol rate". The base symbol rate may not necessarily be the same as the payload symbol rate. Further, payload 214 contains the data of the transmitting device and can be transmitted at a different symbol rate from the base symbol rate, most conveniently at an integral multiple of the base symbol rate (2×, 3×, 4, etc.). The possible payload symbol rates are generally defined in a system specification. For example, a system specification could allow the payload 214 to be either equal to the base symbol rate or twice the base symbol rate. For example, if the base symbol rate is 2 MSPS, the payload could be transmitted at two (2) MSPS or four (4) MSPS.

Conventional adaptive equalizers are unable to accommodate various payload symbol rates and suffer substantial performance degradation as a result. For example, conventionally, when a packet is received that has the payload transmitted at two (2) MSPS, the adaptive equalizer can be trained by preamble 210, which was transmitted at two (2) MSPS; however, when the payload is transmitted at four (4) MSPS, the adaptive equalizer may not perform well since it was trained at two (2) MSPS. There is therefore an intense need in the art for methods and systems that are capable of training equalizers at proper symbol rates to improve performance.

SUMMARY OF THE INVENTION

In accordance with the purpose of the present invention as broadly described herein, there is provided methods and devices for training an equalizer based on multiple symbol rate packets. In one aspect of the present invention, an equalizer is trained based on a packet, which includes a preamble segment, a header segment and a payload segment, wherein each of the segments has a symbol rate. Further, the equalizer has a number of filter taps. A training method of the equalizer includes adapting the filter taps according to the preamble segment and extracting from the header segment a symbol rate value of the payload segment. Next, it is determined whether the symbol rate value extracted from the header segment indicates that the symbol rate of the payload segment is higher than the symbol rates of the preamble and header segments. If such determination indicates that the symbol rate of the payload segment is higher, the filter taps are re-adapted according to the preamble segment, and a number of zeros are inserted into the preamble and header segments to account for the difference between the symbol rate of the payload segment and the symbol rates of the preamble and header segments. In one aspect, the method also includes forcing a zero decision when a zero is inserted into the preamble and header segments.

For example, it may be determined that the symbol rates of the preamble and header segments are two (2) MSPS and that the symbol rate value in the header segment indicates four (4) MSPS. In such event, a zero is inserted between each symbol of the preamble and header segments.

In another aspect, a communications device is capable of receiving a packet including a preamble segment, a header segment and a payload segment, wherein each of the segments has a symbol rate. The communications device includes a processor, which is capable of extracting from the header segment a symbol rate value of the payload segment and is further capable of determining, based on the symbol rate value, whether the symbol rate of the payload segment is higher than the symbol rates of the preamble and header segments. The communications device also includes an equalizer that is capable of inserting a number of zeros into the preamble and header segments, if the processor determines that the payload segment is higher than the symbol rates of the preamble and header segments. Further, the equalizer includes a decision block, which is capable of forcing a zero decision when a zero is inserted into the preamble and header segments.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2 illustrates the structure of an exemplary data packet.

FIG. 3a illustrates exemplary symbols of the data packet of FIG. 2 at two (2) MSPS.

FIG. 3b illustrates exemplary symbols of the data packet of FIG. 2 at four (4) MSPS.

DESCRIPTION OF EXEMPLARY EMBODIMENTS

Figure 1:
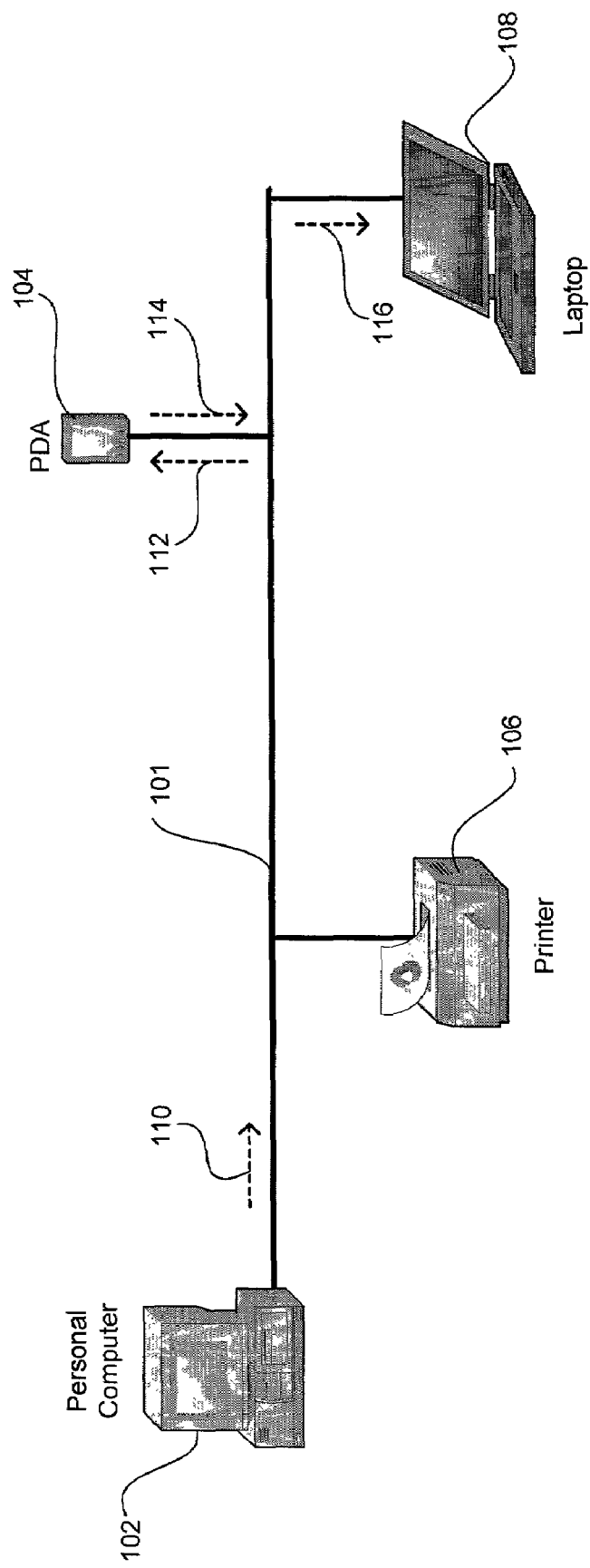
FIG. 1 illustrates an exemplary communications network.

It should be appreciated that the particular implementations shown and described herein are merely exemplary and are not intended to limit the scope of the present invention in any way. For example, although the present invention is described using computer networks, it should be noted that the present invention may be implemented in other communications systems and is not limited to computer networks. Indeed, for the sake of brevity, conventional data transmission and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communications system.

FIG. 3a illustrated exemplary packet 300, which includes preamble 301 and header 302 that are transmitted at two (2) MSPS. Further, packet 300 includes payload 304 that is also transmitted at two (2) MSPS. Packet 300 shows transmitted symbols in terms of voltage levels along the vertical axis. In FIG. 3, time runs from left to right, such that symbols to the left are transmitted earlier in time than symbols to the right.

Each symbol in packet 300 is separated by a duration T, as shown by the distance between symbol 306 and 308.

FIG. 3b illustrated exemplary packet 350, which includes preamble 351 and header 352 that are transmitted at two (2) MSPS. Further, packet 300 includes payload 354 that, unlike payload 304 of FIG. 3a, is transmitted at a different symbol rate than preamble 351 and header 352, for example, at four (4) MSPS. Because the symbol rate of payload 354 is twice that of the symbol rate of payload 304, the duration between each symbol in payload 354 in packet 350 is half as long as the duration of payload 304 in packet 300. The duration between each transmitted symbol in packet 354 is T/2, as shown by the duration between symbol 362 and symbol 364. Since the duration is shorter, an adaptive equalizer that is processing packet 350 must process four (4) MSPS payload 354 twice as fast. In one embodiment, preamble 351 and header 352 of packet 350 are similar to preamble 301 and header 302 of packet 300, in that preamble 51 and header 352 are transmitted at two (2) MSPS. In other words, the duration between symbol 356 and symbol 358 is T, which is the same duration between symbols for packet 300. It should be noted that the symbol rate of packet 350 doubles as soon as payload 354 is transmitted.

When an adaptive equalizer processes packet 350 with payload 354 at four (4) MSPS, the change in rate from two (2) MSPS (i.e. preamble 351 and header 352) to four (4) MSPS (i.e. payload 354), such rate change can cause many problems, since the adaptive equalizer was originally trained at two (2) MSPS. Generally, an adaptive equalizer that is optimal for an input that is transmitted at two (2) MSPS is not optimized for an input that is transmitted at four (4) MSPS. Accordingly, the adaptive equalizer that has been trained based on preamble 301 at two (2) MSPS will not perform optimally, when used to equalize payload 350 at four (4) MSPS. Since preamble 351 is transmitted at two (2) MSPS, the adaptive equalizer has no reference preamble at four (4) MSPS when an adaptive equalizer were to train itself to a four (4) MSPS sequence. In one embodiment, the adaptive equalizer is configured to insert zeros between input samples to achieve a higher symbol rate for preamble 351 and header 352.

Figure 4:
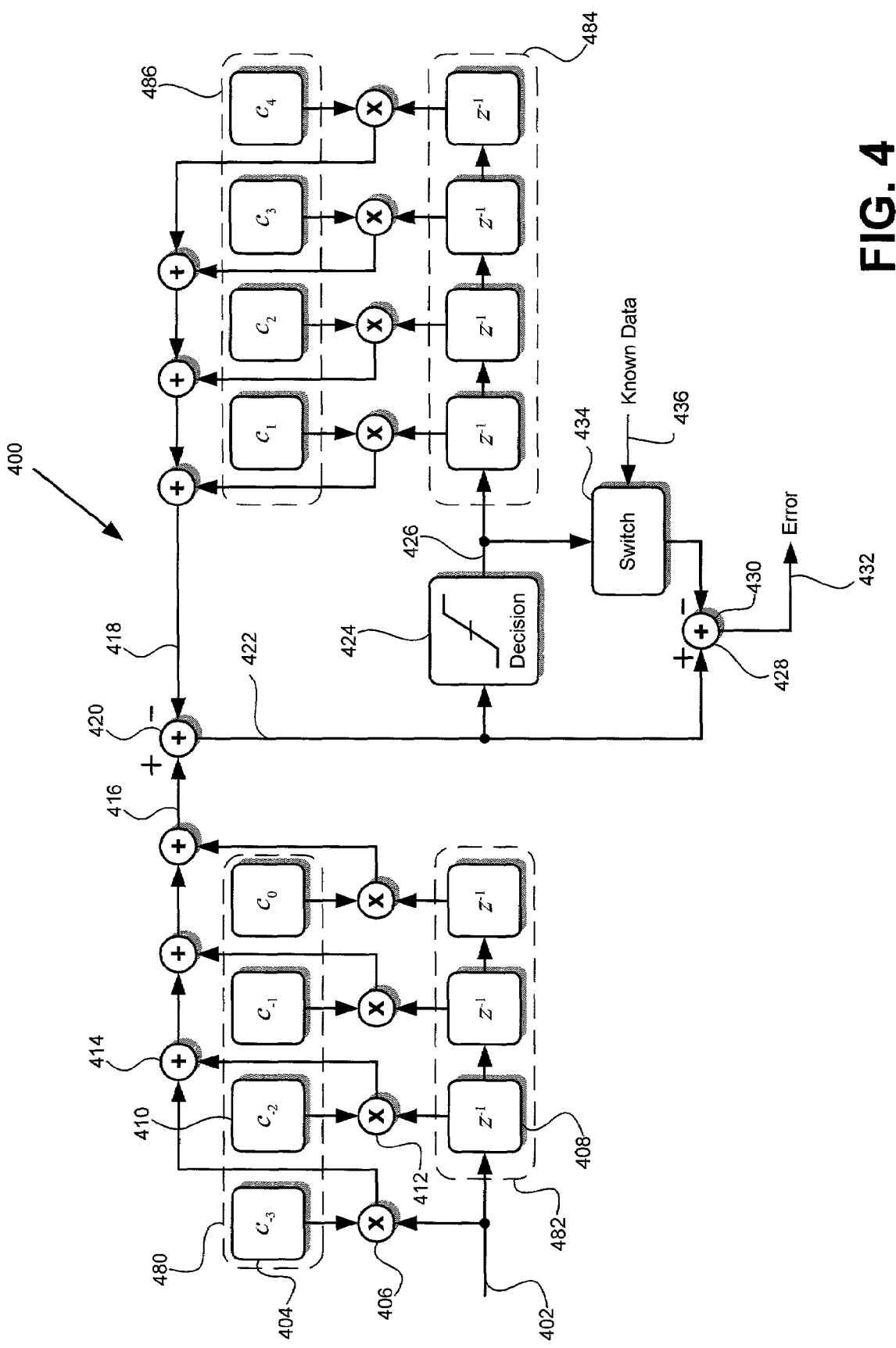
FIG. 4 illustrates an exemplary decision feedback equalizer for multi-symbol rate burst equalization, according to one embodiment of the present invention.

FIG. 4 illustrates a decision feedback equalizer ("DFE") 400 for mitigating distortive effects of the transmission medium, such as ISI or echoes. DFE 400 receives data at input data stream 402, which is coupled to feedforward filter delay line 482 by way of unit delay 408. Input data stream 402 is multiplied by first filter tap 404 by way of multiplier 406. A previous input that has been delayed by unit delay 408 is multiplied by second filter tap 410 by way of multiplier 412. The products of multiplier 406 and 408 are summed by adder 414. The multiplication and summation operations are repeated for the remaining elements in the feedforward filter. Feedforward output 416 is added to negated feedback filter output 418 by way of adder 420 to produce DFE output 422. DFE output 422 is added to a negated switch output 430 by way of adder 428 to produce error signal 432. Decision block 424 quantizes DFE output 422 to the most likely transmitted symbol to produce decision output 426. An example of decision block 424 for equally probable antipodal symbols would be a slicer with a decision threshold positioned at the mean value of the two symbols. Decision output 426 is fed to switch 434, which also accepts input from known data 436. Decision output is also coupled to input of feedback filter delay line 484. Feedback taps 486 are multiplied with decisions in feedback filter delay line 484 and summed to form feedback filter output 418.

As discussed above, ISI may be composed of pre-cursor ISI and post-cursor ISI. An adaptive equalizer, such as DFE 400, may comprise separate filters to mitigate the effects of pre-cursor ISI and post-cursor ISI separately. DFE 400 comprises a feedforward filter and a feedback filter to mitigate post-cursor ISI and pre-cursor ISI, respectively. The feedforward filter consists of feedforward taps 480 and feedforward filter delay line 482 along with corresponding multipliers and adders to produce feedforward filter output 416. The feedback filter consists of feedback taps 486 and feedback filter delay line 484 along with corresponding multipliers and adders to produce feedback filter output 418.

Feedforward taps 480 and feedback taps 486 must adapt in order to accommodate a time-varying characteristics of the transmission medium. Error signal 432 is used to adapt feedforward taps 480 and feedback taps 486. DFE 400 may use an adaptive algorithm such as the least mean square ("LMS") algorithm, or alternatively a zero-forcing algorithm, to adapt feedforward taps 480 and feedback taps 486.

In determining error signal 432, DFE 400 may use decision output 426 or known data 436. If input data stream 402 comprises unknown data, such as when DFE 400 is processing header 302 or 352 or payload 304 or 354, then decision output 426 is used in determining error signal 432. However, if input data stream 402 is known, such as when DFE 400 is processing preamble 301 or 351, then error signal 432 is determined using known data 436. When DFE 400 processes preamble 301 or 351, switch 434 provides known data 436 to adder 428. On the other hand, when DFE 400 is processing header 302 or 352 or payload 304 or 354, switch 434 provides decision output 426 to adder 428.

According to some embodiments, DFE 400 is configured to process a packet containing a payload at multiple symbol rates. For example, in one embodiment, DFE 400 is configured to process a packet containing a payload at either two (2) MSPS or four (4) MSPS. In such embodiment, first, DFE 400 trains feedforward taps using preamble 301 or 351. After training the taps, a processor (not shown) determines the symbol rate of payload 304 or 354 by extracting the symbol rate information from header 302 or 352. After determining the symbol rate of payload 304 or 354, DFE 400 either continues to process the payload, if the payload is transmitted at two (2) MSPS, e.g. payload 304, or DFE 400 immediately restarts the training process if it is determined that the payload is transmitted at four (4) MSPS, e.g. payload 354.

In case of packet 350, the filter taps were trained on two (2) MSPS training sequence by way of preamble 351; therefore, feedforward taps 480 and feedback taps 486 are not configured to accommodate four (4) MSPS data. Once the processor determines that the payload is transmitted at four (4) MSPS, DFE 400 should begin retraining the filter taps accordingly. Input data stream 402 may be buffered or stored in memory, for example, so that it may be accessed again. As such, DFE 400 can restart training the filter taps by reloading preamble 351 as input data stream 402. At this point, DFE 400 inserts zeros into input data stream 402 to match the transmitted symbol rate of payload 354. DFE 400 inserts one zero between each sample of input data stream 402 for preamble 351 and header 352.

When DFE 400 inserts zeros into input data stream 402, the inserted zeros may modify the time and frequency characteristics of the received signal, as is common with upsampling. Changing the time and frequency characteristics of the received signal interferes with the filter adaptation process. In one embodiment, decision block 424 zeros decision output 426 whenever a zero is inserted into input data stream 402 to accommodate any changes in time and frequency characteristics of the receive signal due to zero insertion.

When payload 354 is transmitted at four (4) MSPS, DFE 400 must operate twice as fast as when the payload is transmitted at two (2) MSPS. As such, by maintaining the same length filters and accepting an input twice as fast, the filter spans a shorter span of ISI. In other words, if filter taps of DFE 400 spans a shorter length of time, it will be less effective in mitigating a ISI which could span a longer distance of time. DFE 400 should be provided sufficient time to mitigate the effects of ISI. In one embodiment, DFE 400 reconfigures the main tap delay and loads feedforward taps 480 and feedback taps 486 with new taps to reduce precursor ISI which may be at a different delay offset. DFE 400 can alternatively be configured to use more taps when the payload symbol rate is different than that of the preamble.

It should be noted that in the previous example, DFE 400 is described using a dual symbol rate for the payload; however, in other embodiments, DFE 400 can be configured to accommodate more than two symbol rates. If symbol rate of the payload is an integer multiple of the base symbol rate, then DFE 400 may insert a sufficient number of zeros into input data stream 402 to obtain the same symbol rate as the payload. Further, the present invention is not limited to decision feedback equalizers and may be applied other types of equalizers, for example, an equalizer that does not contain decision block 426 for equalization. An equalizer that does not have decision block 426 would couple DFE 400 output 422 to feedback filter delay line 484 directly. Further, a linear equalizer is another alternative that may be utilized. Also, in one embodiment, DFE 400 may include fractionally spaced taps or symbol rate taps.

Figure 5:
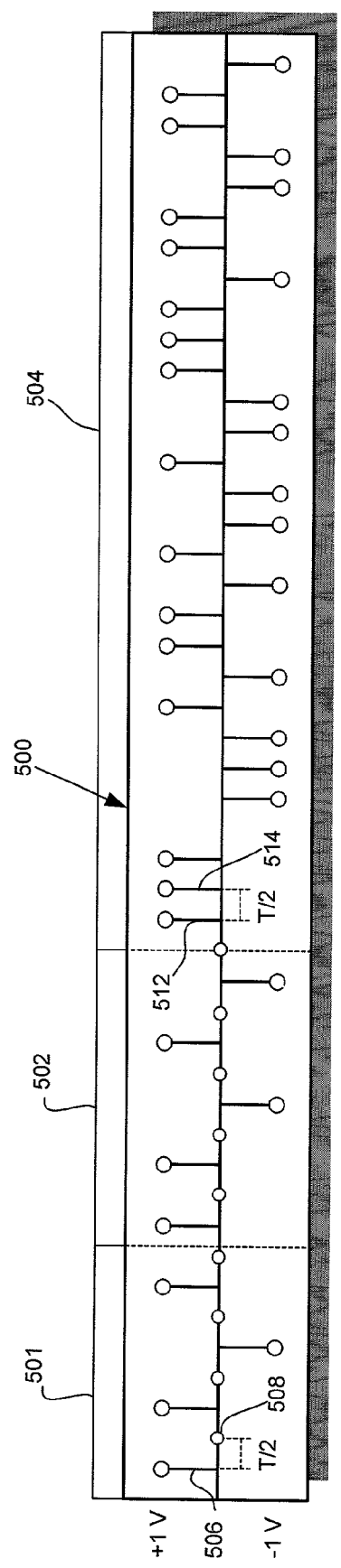
FIG. 5 illustrates the data packet of FIG. 3b with zero insertions, according to one embodiment of the present invention.

FIG. 5 illustrates packet 500, which is packet 354 of FIG. 3b including zero insertions. The initial portion of packet 500 contains preamble 501 and header 502. Preamble 501 and header 502 have zero inserted samples between every other symbol. As described above, DFE 400 inserts a zero into every other symbol in preamble 501 and header 502 to achieve a higher symbol rate. As such symbol rate of preamble 501 and header 502 are matched to payload 504. Sample 508 is a zero inserted sample that doubles the symbol rate of preamble 501 and header 502. The duration between sample 506 and sample 508 is T/2, thus doubling the symbol rate of preamble 501 and header 502. Payload 504 contains samples that are separated by a duration of T/2, as shown by the duration between sample 512 and sample 514. DFE 400 inserts zeros into preamble 501 and header 502 when DFE 400 determines that payload 504 is transmitted at four (4) MSPS through extracting the symbol rate information from header 502.

Figure 6:
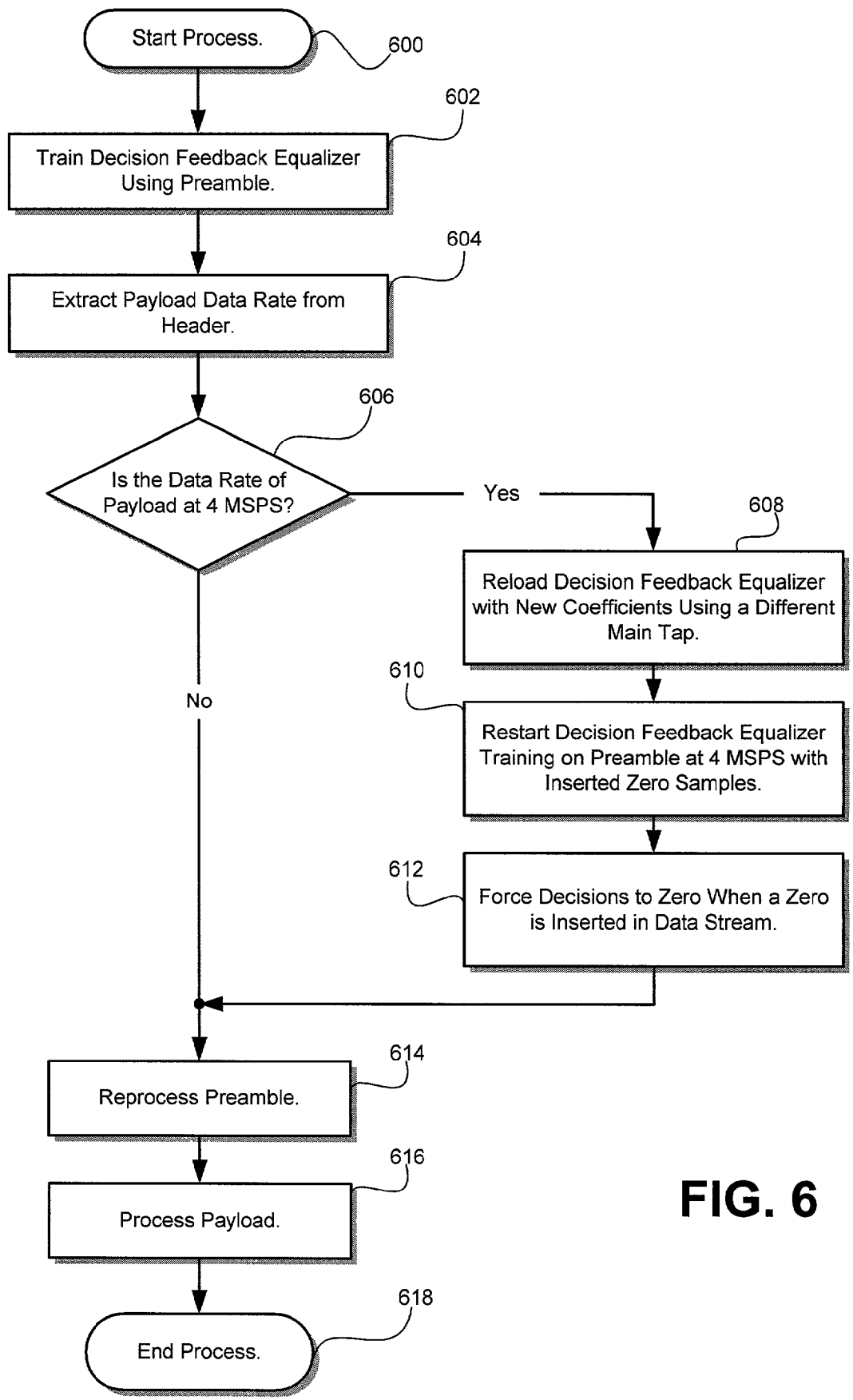
FIG. 6 illustrates an exemplary flowchart for training an equalizer, according to one embodiment of the present invention.

FIG. 6 illustrates an exemplary flowchart for training DFE 400. At step 600, DFE 400 begins the process when a packet is received. In step 602, DFE 400 trains the filter taps using preamble 301 or 351. Since preamble 301 or 351 is known data to DFE 400, DFE 400 configures switch 434 to output known data 436 to adder 428. When DFE 400 is finished processing preamble 301 or 351, DFE 400 configures switch 434 to output decision output 426 rather than known data 436. In step 604, during or after processing header 302 or 352, DFE 400 extracts modulation type and the symbol rate of payload 304 or 354 from header 302 or 352, respectively. With the symbol rate information provided by header 302 or 352, DFE 400 then proceeds to step 606.

In step 606, DFE 400 determines if the symbol rate of payload 302 or 352 is two (2) or four (4) MSPS. If the symbol rate of the payload is determined to be four (4) MSPS, e.g. payload 354, DFE 400 proceeds to step 608. Otherwise, the symbol rate of the payload is two (2) MSPS and DFE 400 proceeds to step 614.

In step 608, DFE 400 reloads feedback taps and/or feedforward taps with new taps. DFE 400 then proceeds to step 610. Next, in step 610, DFE 400 restarts training on preamble 351 at four (4) MSPS using inserted zero samples. Such training allows the feedforward taps 480 and feedback taps 486 to be trained at four (4) MSPS, so that DFE 400 can process the symbol rate for payload 354. DFE 400 may use an adaptive algorithm, such as the LMS algorithm, to adapt filter taps. DFE 400 then proceeds to step 612. In step 612, DFE 400 forces decision output 426 to zero when a zero is inserted into input data stream 402, which causes feedforward taps 480 and feedback taps 486 to better adapt with less misadjustment. DFE 400 then proceeds to step 614.

As shown, step 614 may be reached via either step 606 or step 612. In one embodiment, in step 614, DFE 400 may reprocess preamble 210 a few more times to refine filter taps of feedforward taps 480 and feedback taps 486. Depending on various factors, such as the type of adaptive algorithm, the severity of the transmission medium interference, or the bit depths used in implementation, the number of times that DFE 400 reprocesses preamble 301 or 351 may vary. DFE 400 may additionally reprocess header 302 or 352. DFE 400 may store preamble 301 or 351 in memory, so that DFE 400 can reprocess preamble 301 or 351. After reprocessing preamble 301 or 351, DFE 400 then proceeds to step 616.

In step 616, after reprocessing preamble 210, filter taps of feedforward taps 480 and feedback taps 486, in general, will sufficiently converge to achieve optimal performance. In this step, DFE 400 processes payload 304 or 354 at the symbol rate that was extracted from header 302 or 352 in step 604. After DFE 400 processes payload 304 or 354, the process ends at step 616.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A method of training an equalizer based on a packet including a preamble segment, a header segment and a payload segment, wherein each of said segments has a symbol rate and said equalizer has a plurality of filter taps, said method comprising the steps of:
    adapting said plurality of filter taps according to said preamble segment;
    extracting from said header segment a symbol rate value of said payload segment;
    determining whether said symbol rate value indicates that said symbol rate of said payload segment is higher than said symbol rates of said preamble and header segments;
    re-adapting said plurality of filter taps according to said preamble segment if said determining step determines that said symbol rate of said payload segment is higher than said symbol rates of said preamble and header segments, wherein, for said re-adapting step, a plurality of zeros are inserted into said preamble segment to account for the difference between said symbol rate of said payload segment and said symbol rate of said preamble segment;

forcing a zero decision when a zero is inserted into said preamble segment.

2. The method of claim 1, wherein said symbol rate of said preamble segment and said symbol rate of said header segment are the same.

3. The method of claim 1, wherein said symbol rate of said preamble segment is two MSPS and said symbol rate value in said header segment indicates four MSPS.

4. The method of claim 3, wherein a zero is inserted between each symbol of said preamble segment.

5. The method of claim 4, wherein a zero is inserted between each symbol of said header segment.

6. A method of training an equalizer based on a packet including a preamble segment, a header segment and a payload segment, wherein each of said segments has a symbol rate and said equalizer has a plurality of filter taps, said method comprising the steps of:
   adapting said plurality of filter taps according to said preamble segment;
   extracting from said header segment a symbol rate value of said payload segment;
   determining whether said symbol rate value indicates that said symbol rate of said payload segment is higher than said symbol rates of said preamble and header segments; and
   re-adapting said plurality of filter taps according to said preamble segment if said determining step determines that said symbol rate of said payload segment is higher than said symbol rates of said preamble and header segments;
   wherein, for said re-adapting step, a plurality of zeros are inserted into said preamble segment to account for the difference between said symbol rate of said payload segment and said symbol rate of said preamble segment, and wherein a plurality of zeros are inserted in said header segment to account for the difference between said symbol rate of said payload and said symbol rate of said header.

7. A communications device capable of receiving a packet including a preamble segment, a header segment and a payload segment, wherein each of said segments has a symbol rate, said communications device comprising:
   a processor capable of extracting from said header segment a symbol rate value of said payload segment and capable of determining, based on said symbol rate value, whether said symbol rate of said payload segment is higher than said symbol rates of said preamble and header segments; and
   an equalizer capable of inserting a plurality of zeros into said preamble and header segments, if said processor determines that said payload segment is higher than said symbol rates of said preamble and header segments;
   wherein said equalizer includes a decision block capable of forcing a zero decision when a zero is inserted into said preamble and header segments.

8. The communications device of claim 7, wherein said symbol rate of said preamble segment is two MSPS and said symbol rate value in said header segment indicates four MSPS.

9. The communications device of claim 8, wherein a zero is inserted between each symbol of said preamble segment.

10. The communications device of claim 9, wherein a zero is inserted between each symbol of said header segment.

11. The communications device of claim 7, wherein said equalizer is a decision feedback equalizer.

12. The communications device of claim 7, wherein said equalizer includes a feedforward filter and a feedback filter.

13. The communications device of claim 7, wherein said equalizer is a linear equalizer.

14. A method of training an equalizer based on a packet, including a preamble segment, a header segment and a payload segment, wherein each of said segments has a symbol rate, said method comprising the steps of:
   buffering said packet in a memory;
   processing said preamble segment;
   extracting a symbol rate value of said payload segment from said header segment;
   inserting zeros in said preamble and header segments buffered in said memory according to the difference between said symbol rate value of said payload segment and said symbol rates of said preamble and header segments;
   re-processing said preamble and header segments after said inserting step; and
   forcing a zero decision when a zero is inserted into said preamble and header segments.

15. The method of claim 14, wherein said equalizer includes a plurality of filter taps, and wherein said processing step includes adapting said plurality of filter taps.

16. The method of claim 15, wherein said re-processing step includes re-adapting said plurality of filter taps.

17. The method of claim 14, wherein said buffering step is performed concurrently with said processing step.

18. The method of claim 14, wherein said symbol rate of said preamble segment and said symbol rate of said header segment are the same.

19. The method of claim 14, wherein said symbol rates of said preamble and header segments are two MSPS and said symbol rate value in said header segment indicates four MSPS.

20. The method of claim 19, wherein a zero is inserted between each symbol of said preamble and header segments.

* * * * *